United States Patent [19]

Vora et al.

[11] Patent Number: 5,120,825

[45] Date of Patent: Jun. 9, 1992

[54] POLYMERS CONTAINING BOTH IMIDAZOLE AND IMIDAZOLONE STRUCTURAL UNITS

[75] Inventors: Rohitkumar H. Vora, Westfield; Paul N. Chen, Sr., Gillette, both of N.J.

[73] Assignee: Hoechst Celanese Corp., Somerville, N.J.

[21] Appl. No.: 631,557

[22] Filed: Dec. 21, 1990

[51] Int. Cl.$^5$ .................. C08G 69/26; C08G 8/02; C08G 63/00; C08G 12/00
[52] U.S. Cl. ..................... 528/350; 528/26; 528/28; 528/125; 528/126; 528/128; 528/171; 528/172; 528/173; 528/183; 528/185; 528/186; 528/188; 528/190; 528/229; 528/342
[58] Field of Search ............... 528/350, 342, 171, 172, 528/26, 28, 125, 126, 128, 173, 186, 183, 188, 185, 190, 229

[56] References Cited

U.S. PATENT DOCUMENTS

| | | | |
|---|---|---|---|
| 3,509,108 | 4/1970 | Prince | 528/342 |
| 3,686,149 | 8/1972 | Ohfuji | 528/342 |
| 4,312,976 | 1/1982 | Choe | 528/342 |
| 4,448,687 | 5/1984 | Wang | 528/342 |
| 4,483,977 | 11/1984 | Conciatori et al. | 528/342 |
| 4,656,244 | 4/1987 | Ahne | 528/342 |

FOREIGN PATENT DOCUMENTS 527453  3/1975  U.S.S.R. .............. 528/342

*Primary Examiner*—Morton Foelak
*Assistant Examiner*—P. Hampton-Hightower
*Attorney, Agent, or Firm*—J. M. Hunter, Jr.

[57] ABSTRACT

The present invention provides for hybrid polybenzimidazole and polybenzimidazolone polymers which are characterized as containing both imidazole and imidazolone structural units in the polymer chain. These polymers are characterized as containing at least one recurring monomer unit containing the structure of the formula:

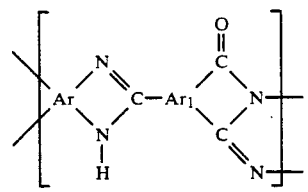

wherein Ar is a tetravalent aromatic moiety derived from an aromatic tetraamine and $Ar_1$ is a trivalent aromatic moiety derived from a trifunctional acid, an acid anhydride or amine-reactive derivatives thereof, said polymers further characterized by an inherent viscosity of at least about 0.01 dl/g measured as a 0.5% solution in N-methyl pyrrolidone at 25° C.

The polymers of this invention exhibit many of the advantageous properties of both polybenzimidazole and polybenzimidazolone polymers. They are characterized as being extremely resistant to chemical attack such as by solvents, acids and bases. Their high thermal stability and excellent electrical properties (low dielectric constant) render them useful in electrical and electronic applications.

19 Claims, No Drawings

POLYMERS CONTAINING BOTH IMIDAZOLE AND IMIDAZOLONE STRUCTURAL UNITS

BACKGROUND OF THE INVENTION

1. Field of the Invention

This invention relates to polymers containing both imidazole and imidazolone structural units in the polymer chain and to a process for their production.

2. Description of Related Art

Polybenzimidazole polymers (hereinafter sometimes referred to as PBI polymers) are a known class of heterocyclic polymers which contain recurring units of the structure:

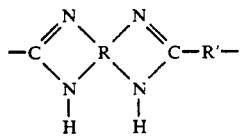

where R is a tetravalent aromatic nucleus with the nitrogen atoms forming the benzimidazole rings being paired upon adjacent carbon atoms, i.e., ortho carbon atoms, of the aromatic nucleus, and R' is a member of the class consisting of an aromatic ring; an alkylene group (preferably having 4 to 8 carbon atoms); and a heterocyclic ring such as pyridine, pyrazine, furan, quinoline, thiophene, and pyran.

The following generalized equation illustrates the condensation reaction which occurs in forming the polybenzimidazoles having the recurring units as set forth above:

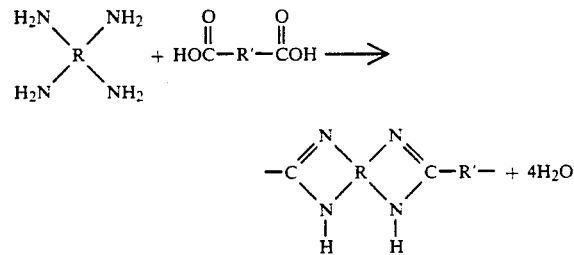

Such polybenzimidazoles are produced by the reaction of a mixture of (1) at least one aromatic tetraamine containing two groups of amine substituents, the amine substituents in each group being in an ortho position relative to each other, and (2) at least one dicarboxylic acid or derivative thereof.

Such PBI polymers are characterized by very good thermal, physical and chemical stability and may be formed into fibers, films and membranes. Examples of such PBI polymers, their process for production and articles prepared therefrom are disclosed in U.S. Pat. Nos. 3,987,015, 4,312,976, 4,431,796, and 4,814,530, the complete disclosures of which references are incorporated herein by reference.

PBI polymers which have been modified to enhance their properties of thermal stability and solvent solubility are also known in the art. For example, U.S. Pat. No. 3,671,491 discloses the preparation of random benzimidazole-benzoxazole copolymers prepared by condensing a mixture of an aromatic tetraamine (such as 3,3'-diamino benzidene), a hydroxy substituted aromatic diamine (such as 3,3'-diamino4,4'dihydroxy biphenyl) and an aromatic dicarboxylic acid or derivative thereof (such as diphenyl isophthalate).

Another category of polymer material exhibiting high thermal stability are the polybenzimidazolone polymers (hereinafter sometimes referred to as PBIL polymers). Such polymers may be generally characterized as containing recurring units of the structure:

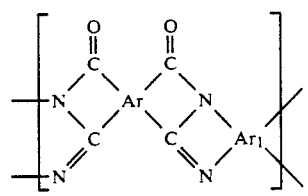

wherein Ar and $Ar_1$ are the same or different aromatic nuclei. Precursors of these PBIL polymers are generally prepared by forming the condensation reaction product of an aromatic tetraacid or derivative, or an aromatic dianhydride (such as biphenyl dianhydride) and an aromatic tetraamine (such as 3,3'-diamino benzidene). Such polymers are disclosed in Marvel, C.S. *Journal of Polymer Science, Part A*, (3), p. 3549, (1965).

Similar PBIL polymers are also disclosed in U.S. Pat. No. 3,987,015 which teaches a process for the preparation of both PBI and PBIL polymers in finally divided particulate form.

U.S. Pat. No. 4,260,652 discloses a process for producing a permselective composite membrane wherein a significant number of what are referred to as polybenzimidazolone polymers are disclosed. See for example, columns 33 through 44. The polybenzimidazolone polymers disclosed may or may not include polyphenyl rings linked by bridging members selected from the group consisting of: $-O-$, $-SO_2-$, $-CO-$, $-CH_2-$, and $-C(CH_3)_2-$.

U.S. Pat. No. 4,656,244 discloses a process for the preparation of radiation-reactive precursors of PBI and PBIL polymers wherein an aromatic or heterocyclic tetraamino compound (such as diaminobenzidene) is reacted with an olefinically unsaturated monocarboxylic acid (such as acrylic acid) and an aromatic dicarboxylic acid (such as isophthalic acid) to produce modified PBI type polymers, or with an aromatic tetraacid or derivative thereof (such as pyromellitic dianhydride) to produce PBIL type polymers. These precursor polymers are said to exhibit photosensitivity due to the presence of the added olefinically unsaturated compound in the precursor polymer molecules. A wide variety of aromatic structures and groups linking these aromatic structures are disclosed on columns 4–9 of this patent.

Copending application Ser. Nos. 07/494,009, filed in the USPTO on Mar. 15, 1990, and 07/505,742 filed in the USPTO on Apr. 6, 1990 disclose PBIL type polymers prepared by forming the polymer condensation product of an organic tetraamine such as 3,3',4,4'-tetraamino biphenyl or 2,2,-bis (3,4-diaminophenyl) hexafluoropropane and an aromatic dianhydride containing a hexafluoroisopropylidene group such as 2,2'bis(3,4-dicarboxy phenyl) hexafluoropropane dianhydride.

Copending application Ser. No. 07/487,330, filed in the USPTO on Mar. 1, 1990, discloses PBI type polymers prepared by forming the polymer condensation product of 2,2'-bis(3,4-diaminophenyl) hexafluoropropane with an aromatic dicarboxylic acid such as isophthalic acid or 4,4'-diphenyl-hexafluoroisopropylidene dicarboxylic acid.

The polymers of these copending applications are characterized as having improved solvent solubility, low temperature processibility, low moisture absorption, high thermal stability, resistance to solvents after curing, excellent mechanical properties, easy blending with other polymers, low dielectric constants, and excellent electric properties when compared to PBI and PBIL polymers which do not contain the fluorine-containing linking groups.

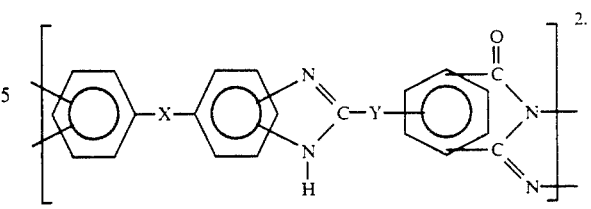

or more preferably of the formula 3:

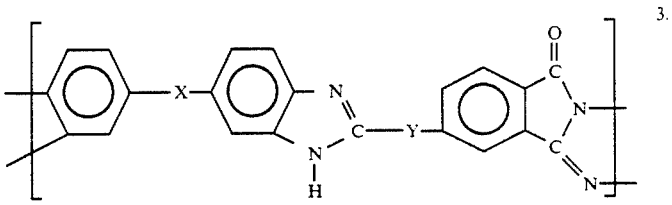

SUMMARY OF THE INVENTION

The present invention provides for hybrid polybenzimidazole and polybenzimidazolone polymers which are characterized as containing both imidazole and imidazolone structural units in the polymer chain. These polymers are characterized as containing at least one recurring monomer unit containing the structure of formula 1:

wherein Ar is a tetravalent aromatic moiety derived from an aromatic tetraamine and $Ar_1$ is a trivalent aromatic moiety derived from a trifunctional acid, an acid anhydride or amine-reactive derivatives thereof, said polymers further characterized by an inherent viscosity of at least about 0.01 dl/g measured as a 0.5% solution in N-methyl pyrrolidone at 25° C.

The polymers of this invention exhibit many of the advantageous properties of both polybenzimidazole and polybenzimidazolone polymers. They are characterized as being extremely resistant to chemical attack such as by solvents, acids and bases. Their high thermal stability and excellent electrical properties (low dielectric constant) render them useful in electrical and electronic applications.

In particular these products have significant use in the aerospace, composite, and electronic industries. Also, these polymers have excellent gas separation properties which make them very useful as materials for the preparation/fabrication of gas separation membranes of various types.

DETAILED DESCRIPTION OF THE INVENTION

The more preferred polymers within the scope of formula 1 set forth above may be characterized as containing at least one recurring structural unit of the formula 2:

wherein Y is selected from the group consisting of a covalent carbon to carbon bond and and wherein X is a divalent moiety independently selected from a covalent carbon to carbon bond, methylene, ethylene, propylene, isopropylene, hexafluoroisopropylidene, 1-phenyl-2,2,2-trifluoro ethylidene, dichloro and difluoroalkylenes containing up to 3 carbons, oxy, thio, sulfinyl, sulfonyl, sulfonamido, carbonyl, oxydicarbonyl, oxydimethylene, sulfonyldioxy, carbonyldioxy, disilanylene, polysilanylene containing up to 8 Si atoms, disiloxanylene, and a polysiloxanylene containing up to 8 Si atoms.

Preferably, the linking group X is selected from oxy, hexafluoroisopropylidene, 1-phenyl-2,2,2-trifluoroethylidene, carbonyl, methylene, a covalent carbon to carbon bond, disiloxanylene and polysiloxanylenes. Most preferably, X is a carbon to carbon bond, methylene, hexafluoroisopropylidene, 1-phenyl-2,2,2- trifluoroethylidene and oxy.

The hydrogen atoms of the aromatic groups set forth in formulas 1, 2, and 3 may be substituted by one or more non-interfering monovalent substituents such as chloro, fluoro, lower alkyl or alkoxy having up to 6 carbon atoms and phenyl. Also, the term "aromatic" as used herein is meant to include heteroaromatics wherein one or more of the ring atoms is replaced with —O—, —S or —N atoms.

Polymers having the structures set forth above are prepared by forming the polymer condensation product of at least one aromatic tetraamine or a mixture of such tetraamines with an aromatic tricarboxylic acid or acid monoanhydride or a mixture of such acids or anhydrides to form a precursor polymer which, after curing by heat or chemical cyclization, yields a polymer having recurring groups of the structure set forth above and having an inherent viscosity of at least about 0.01 dl/g, more preferably at least about 0.02 to 2.0 dl/g, measured as a 0.5% solution in N-methyl pyrrolidone (NMP) at 25° C.

The preferred tetraamines used as monomers in the present invention are aromatic tetraamines wherein the amino groups are paired upon adjacent carbon atoms of the aromatic nucleus, i.e., ortho carbon atoms. Suitable amines include tetraamines of the formula:

$$H_2N-Ar\begin{matrix}NH_2\\|\\|\\NH_2\end{matrix}-NH_2$$

such as:

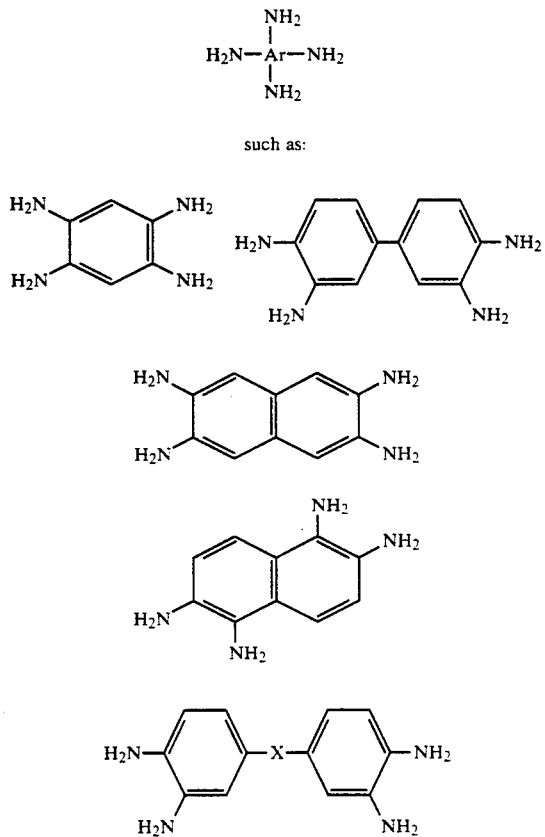

wherein Ar and X are as set forth above.

Such aromatic tetraamines include 1,2,4,5-tetraamino benzene; 1,2,5,6-tetraaminonaphthalene; 2,3,6,7-tetra aminonaphthalene; 3,3',4,4'-tetraaminodiphenyl ether; 3,3',4,4'-tetraaminobiphenyl; 3,3',4,4'-tetraaminodiphenylmethane; 3,3'4,4'-tetraamino-1,2-diphenylethane; 3,3',4,4'tetraamino2,2-diphenylpropane; 3,3',4,4'-tetraamino-2,2-diphenylpropane; 3,3',4,4'-tetraaminodiphenylthioether; 3,3',4,4'-tetraaminodiphenylsulfone and 2,2'-bis(3,4-diaminophenyl)-hexafluoropropane (hereinafter referred to as 6F-Tetraamine). The preferred tetraamines are 3,3',4,4'tetraaminobiphenyl and 6F-Tetraamine.

The aromatic tricarboxylic acids which may be employed as monomers in the present invention are most preferably tricarboxylic acid monoanhydrides and include compounds having the general formula:

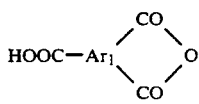

where $Ar_1$ is a trivalent aromatic radical. $Ar_1$ is preferably

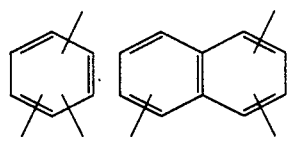

or isomers thereof, and

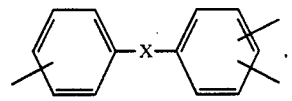

where X is as defined above.

Amine-reactive derivatives of these monoanhydrides may also be used, such as lower alkyl esters or the monoacid halide derivatives.

The preferred tricarboxylic acid monoanhydrides have the carboxyl groups in the anhydride ring paired on adjacent carbon atoms of the aromatic nucleus, and include 4-trimellitic acid anhydride, 4-trimellitoyl anhydride chloride and hexafluoro2-(3,4-carboxy anhydrophenyl)-2-(4-carboxyphenyl) propane.

The tetraamine and tricarboxylic acid monoanhydride reactants, particularly those containing fluorine, are preferably substantially electronically pure and are referred to as electronic grade monomers. They generally should be at least about 98.5% pure, more preferably at least about 99.5% pure.

In the most preferred embodiments of this invention, X is selected from the group consisting of a covalent carbon to carbon bond and $—C(CF_3)_2—$ and Y is selected from the group consisting of a covalent carbon to carbon bond and

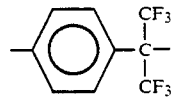

More preferably, either X or Y is the fluorine-containing linking group, or both may be this group.

The polymers of the present invention may be further modified to vary the ratio of the imidazole and imidizolone linkages present in the polymer molecule. For example, up to about 75 percent by weight of the tricarboxylic acid monomer can be replaced with a dicarboxylic acid monomer or derivative thereof which will give rise to polymers having more numerous imidazole linkages with a consequent altering of polymer properties.

Typical dicarboxylic acids useful for this purpose include: terephthalic acid, isophthalic acid; 4,4'-biphenyldicarboxylic acid; 3,4-naphthalenedicarboxylic acid; 1,6-naphthalenedi carboxylic acid; 2,6-naphthalenedicarboxylic acid; 4,4'-diphenyletherdicarboxylic acid;4,4'-diphenyl methanedicarboxylic acid; 4,4'-diphenylsulfone dicarboxylic acid, and 4,4'-diphenylthioetherdi carboxylic acid. Hexafluoro substituents may also be incorporated into the dicarboxylic acids to create hexafluoro dicarboxylic acids such as 4,4'-diphenylhexafluoroisopropylidenedicarboxylic acid. Isophthalic acid is the preferred dicarboxylic acid for use in such a polymer modification.

Similarly, the polymers may be modified to produce more numerous imidazolone linkages by replacing up to about 75 percent by weight of the tricarboxylic acid monomer with an aromatic dianhydride monomer.

Typical dianhydrides useful for this purpose include: 1,1-bis[4-(1,2-di-carboxyphenyl)]1-phenyl-2,2,2-trifluoroethane dianhydride; 3,3',4,4'-diphenyl tetracarboxylic dianhydride; 3,3',4,4'-benzophenone tetracarboxylic dianhydride; bis(3,4-dicarboxyphenylether dianhydride, and 2,2-hexafluoro-bis (3,4-dicarboxyphenyl) propane dianhydride.

Conventional processes may be employed to prepare the polymers of this invention. It is preferred to employ the acid monomers at a ratio at least 1 mole per mole of the aromatic tetraamine. However, in order to obtain a product having an optimum viscosity, it is advantageous to employ excess of up to 0.25 mole percent of the acid monomers with respect to the aromatic tetraamine monomer. The appropriate quantities of the aromatic tetraamine and the aromatic tricarboxylic acid monomers are introduced into a reaction zone and heated therein at a temperature above about 200° C., preferably from about 200° C. to about 325° C. The reaction is conducted in a substantially oxygen free atmosphere, i.e., below about 220 ppm oxygen and preferably below about 8 ppm oxygen. Usually the first stage of reaction is continued until a prepolymer is formed having an inherent viscosity of at least about 0.01 dl/g (determined from a solution of 0.5 grams of the polymer in 100 milliliters of NMP at 25° C.) During this first stage heating process the reactants are preferably agitated by conventional agitation procedures.

After the conclusion of the first stage reaction, which normally takes about 0.5 hours to about 4 hours and preferably about from about 1 to 3 hours, the prepolymer product is cooled to below about 35° C. and pulverized. The prepolymer is then introduced into a second stage polymerization reaction zone where it is heated under substantially oxygen free conditions to yield the cured and cyclized final polymer, desirably with an inherent viscosity of at least about 0.01 dl/g.

The temperature employed in the second stage is at least about 250° C. and preferably from about 275° C. to about 450° C. The second stage reaction generally takes at least about 0.5 hours up to about 3.0 hours or more. The polymer may also be produced by a one step reaction such as described in U.S. Pat. No. 4,312,976, although the previously described two step process is preferred.

The following examples are given as specific illustrations of the invention. All parts and percentages are by weight unless otherwise stated. It is understood however, that the invention is not limited to specific details as set forth in the examples.

EXAMPLE 1

In this example, 2,2'-bis-(3,4-diaminophenyl)-hexa fluoropropane (6F-Tetraamine) is prepared having the structure:

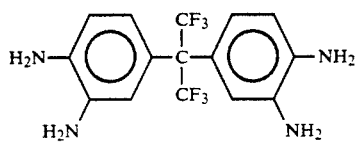

In a conventional 1000 ml three necked, round bottom flask fitted with a heating mantle, thermometer, addition funnel, condenser and a nitrogen blanket was placed 27.5 parts of 2,2'-bis-(4-aminophenyl)-hexafluoropropane dissolved in 100 parts of acetic acid. 18.5 parts of acetic anhydride was slowly added to the solution at 30° C. and the solution was stirred for several hours. Approximately twice the volume of the solution in water was added to the reaction vessel. The acetylated diamine was isolated by filtration, washed with water and air dried to produce 34.4 parts of 2,2-bis-(4-acetylaminophenyl-hexafluoropropane.

This material was then dissolved in 400 parts of 93 percent sulfuric acid in a 2000 ml round bottom flask fitted with a heating mantle, thermometer, addition funnel, condenser and a nitrogen blanket and then cooled to a temperature of 0° C. to 5° C. 17 parts of 70 percent nitric acid were added over a period of one hour and then stirred for an additional hour. 3 parts of sulfamic acid were added to the reaction solution followed by the slow addition of 50 parts of water. The solution was heated at 60° C. to 70° C. for about 6 hours and then drowned with about 2000 parts of water and ice in a 4000 ml beaker fitted with a mechanical stirrer. The slurry was then filtered and the product washed with water, and dried in an oven to produce 34.8 parts of 2,2-bis-(3-nitro4-aminophenyl)-hexafluoro propane.

This material was then dissolved in 150 parts of methanol in a 250 ml pressure-tested Pyrex bottle and hydrogenated over 1.5 parts of a 5 percent palladium on-carbon catalyst under 3 to 4 atmospheres of hydrogen at about 50° C. When the hydrogen uptake stopped, the mixture was cooled, the catalyst was filtered off and the filtrate was combined with about 500 parts of water and ice in a 1000 ml beaker fitted with a mechanical stirrer. The mixture was then filtered, water washed and dried at room temperature to yield 27 parts of 2'2-bis-(3-4-diaminophenyl)-hexafluoropropane. This material was then purified by dissolving it in 50 parts of aqueous hydrochloric acid, filtering it through activated charcoal and reprecipitating it with 50 parts of ammonium hydroxide to yield purified 2,2'-bis-(3,4-diaminophenyl)-hexafluoropropane as a white powder.

EXAMPLE 2

In this example, hexafluoro-2-(3,4 carboxyanhydrophenyl)-2-(4-carboxyphenyl) propane (6F-TMA) is prepared having the structure:

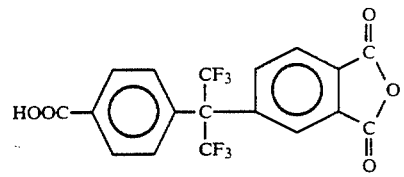

(a) A one liter stainless steel autoclave was charged with 272 g. of 2(3,4-dimethylphenyl)-hexafluoro-isopropanol-2 and 110 g. of toluene. 200 g. of HF were added and the reaction mixture heated at 115° C. for 24 hours. After cooling to 80° C., the HF was distilled off and 200 g. of toluene was added. The solution was transferred to a separation funnel, washed several times with water until the aqueous layer showed neutral reaction. The organic layer was dried over calcium chloride. The product was isolated by distillation under reduced pressure; 287 g. of hexafluoro-2(4-methylphenyl)-2 (3,4-dimethylphenyl) propane was recovered as a colorless liquid, b.p. 131°-134° C.

(b) A one liter stainless steel autoclave, equipped with thermometer, stirrer and gas inlet tube was charged with 138.5 g. of the 6F-trimethyl compound produced in step (a), 2.49 g. of cobalt (II) acetate tetrahydrate, 0.52 g. sodium bromide and 450 g. of acetic acid. The reaction mixture was heated to 140° C. under agitation, and then a stream of air was bubbled through the stirred solution. The temperature of the mixture rose to 180° C. After 35 minutes, the exothermic reaction began to abate and the temperature was kept at 175° C. for an additional 45 minutes by heating. After cooling, the reaction mixture was transferred to a round bottom flask and 2.52 g. of oxalic acid were added. The mixture was refluxed for 1 hour. The solution was then filtered, the acetic acid distilled off and the residue was dissolved in 200 g. of 0.1N HCl by heating. On cooling to room temperature, the crystalline product was precipitated and isolated by filtration, washed with cold water and dried in a vacuum at 80° C.; 153 g. of hexafluoro-2(4-carboxyphenyl)-2 3,4-dicarboxyphenyl) propane was recovered as a white crystal, m.p. 140°-150° C.

(c) 87.2 g. of the 6F-tricarboxylic acid of step (b) was suspended in 300 ml of tetrahydronaphthalene in a one liter round bottom flask equipped with a Dean-Startk trap and condenser. The mixture was heated to reflux whereupon water separated and a clear solution was formed. After the theoretical amount of water was collected, the solution was slowly cooled. A crystalline product began to crystallize below 70° C., which was then isolated by filtration, washed with n-hexane and dried in a vacuum overnight at 150° C.; 77.7 g. of hexafluoro-2-(3,4-carboxyanhydrophenyl)-2-(4-carboxyphenyl) propane was recovered as a white crystal, m.p. 208°-209° C.

EXAMPLE 3

The trimethyl ester of 6F-TMA was prepared as follows: 20 g. of 6F-TMA as produced in Example 2 was dissolved in 100 ml. of dry methanol. One ml. of conc. $H_2SO_4$ was added and the solution was refluxed for 16 hours. The solvent was distilled off and the residue dissolved in 100 ml. of ethyl acetate. This solution was then washed with bicarbonate solution and subsequently with water and dried over sodium sulfate; 17.45 g. of hexafluoro-2-(3,4-di-methoxycarbonylphenyl)-2-(4-methoxycarbonylphenyl) propane was recovered as a clear colorless liquid.

EXAMPLE 4

The monoacid chloride of 6F-TMA was prepared as follows: 30 g. of 6F-TMA as produced in Example 2 was refluxed with 100 ml. of thionylchloride mixed with a catalytic amount (0.5 ml) of dimethylformamide. The mixture was refluxed an additional 30 minutes after cessation of gas formation. The solvent was distilled off and the residue was dissolved in and recrystallized from n-hexane. The crystals were washed in water and dried to yield hexafluoro-2-(3,4-carboxyanhydrophenyl)-2-(4-chlorocarbonylphenyl) propane, yield 31 gm, MP 92°-94° C.

EXAMPLE 5

This example sets forth the preparation of a polymer from 6F-TMA (98% pure) and 3,3',4,4' tetraamino biphenyl (100% pure), hereinafter referred to as TAB, said polymer having recurring units of the structure:

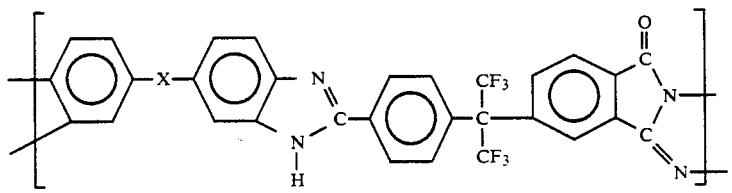

Into a three necked flask equipped with a nitrogen inlet and outlet, a heating mantle, thermometer, addition funnel, mechanical stirrer, temperature controller/timer and a condenser were placed 4.37 gms (0.02 mole) of TAB and 8.53 gms. (0.02 mole) of 6F-TMA produced in accordance with Example 2. The flask was degassed and then filled with nitrogen. The degassing was repeated three times. The mixture was heated with stirring up to 320° C. over a 2 hour period and maintained at 320°-325° C. for 2 hours. The resulting product was then cooled to room temperature and ground.

The ground prepolymer was placed in a flask and, after degassing was repeated, the prepolymer was heated at 350° C. for one hour. Properties of the polymer are listed in Table 1.

EXAMPLE 6

This example sets forth the preparation of a polymer from trimellitic anhydride (TMA) which is 97% pure and TAB (100% pure), said polymer having recurring units of the structure:

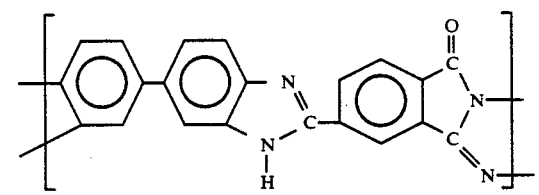

The process of Example 5 was repeated exactly as set forth except that the initial reactants were 5.46 gms. (0.025 mole) of TAB and 4.75 gms. (0.025 mole) of TMA. Properties of the resultant polymer are listed in Table 1.

EXAMPLE 7

This example sets forth the preparation of a polymer from 6F-Tetraamine produced in accordance with Example 1 (99% pure) and 6F-TMA (98% pure), said polymer having recurring units of the structure:

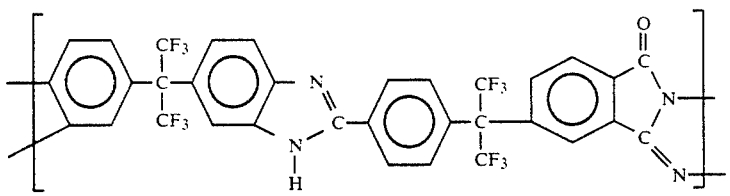

The process of Example 5 was repeated exactly as set forth except that the initial reactants were 3.68 gms. (0.01 mole) of 6F-Tetraamine and 4.27 gms. (0.01 mole) of 6F-TMA. Properties of the resulting polymer are listed in Table 1.

EXAMPLE 8

This example sets forth the preparation of a polymer form 6F-Tetraamine (99% pure) and TMA (97% pure), said polymer having recurring units of the structure:

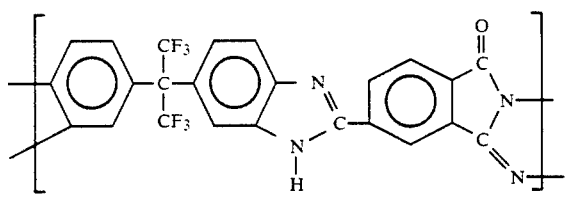

The process of Example 5 was repeated exactly as set forth except that the initial reactants were 2.94 gms. (0.008 mole) of 6F-Tetraamine and 1.59 gms. (0.008 mole) of TMA. Properties of the resulting polymer are listed in Table 1.

TABLE 1

| POLYMER | INHERENT VISCOSITY | TGA 5% WT. LOSS AT °C. (0% RESIDUE AT °C.) | DSC Tg(°C.) |
| --- | --- | --- | --- |
| Example 5 | 0.03 dl/g | 505° C. (725° C.) | 270.5 |
| Example 6 | 0.02 dl/g | 535° C. (740° C.) | 327 |
| Example 7 | 0.05 dl/g | 500° C. (710° C.) | 264 |
| Example 8 | 0.04 dl/g | 510° C. (655° C.) | 325 |

Thermogravemetric analysis (TGA) was determined using a DuPont 951 TGA connected to a DuPont 1090 thermal analyzer operating at a heating rate of 20° C./min using air as a purge gas with a flow rate of 40 cc/min. Inherent viscosity of the polymers was determined at 25° C. from a 0.5% solution of each polymer in NMP. The table shows in the TGA data the temperature at which each polymer exhibited a 5% weight loss and also in parenthesis the temperature at which 0% residue of polymer was achieved.

Glass transition temperatures (Tg) were determined by differential scanning calorimetry using a Perkin Elmer DSC4 calorimeter operating at 20° C./min, nitrogen atmosphere at 60 cc/min. Glass transition temperature by this method is generally defined as the point of intersection of tangent lines about the point of first inflection of the heating curve of the polymer.

The polymers of this invention may be dissolved in their precursor (precyclized) form or in the cyclized form in organocaprotic solvent in which they are soluble to produce films, coatings, composites and the like, which precursor polymers may be subsequently cured by the application of heat.

The polymers may be cast as films useful as wire and cable wraps, motor slot liners or flexible printed circuit substrates. They may be used as coatings on substrates such as aluminum or silicone dioxide. They are also useful to produce high temperature coatings for magnetic wire, dip coatings for various electronic components, protective coatings over glass, metal and plastic substrates, wear coatings, and photoresist coatings useful in microelectronic processing.

They may also be used to produce high temperature adhesives for bonding aerospace structures or electrical circuitry, conductive adhesives when mixed with conductive fillers such as silver or gold for microelectric applications, or adhesives for glass, metal or plastic substrates.

The polymers may also be used as varnish compositions or matrix resins to produce composites and laminates. The varnish compositions and matrix resins may be used to impregnate glass or quartz cloth, or graphite or boron fibers, for the production of radomes, printed circuit boards, radioactive waste containers, turbine blades, aerospace structural components or other structural components requiring high temperature performance, non-flammability and excellent electrical properties.

The polymers may also be used in particulate form and sintered by molding processes such as disclosed in U.S. Pat. No. 4,814,530 to produce chemically resistant gaskets, seals, O-rings and valves in oil-field down holes and in geothermal, petrochemical and other industrial applications. Polymer particles may also be used as catalyst supports, packing material for chromatographic separations and like applications.

What is claimed is:

1. A polymer comprising both imidazole and imidazolone structural units in the polymer chain containing at least one recurring monomer unit of the structure:

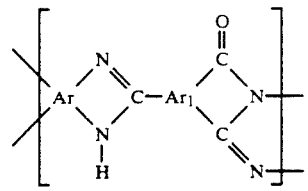

wherein Ar is a tetravalent aromatic moiety derived from a tetraamine and Ar$_1$ is a trivalent aromatic moiety derived from a trifunctional acid, an acid monoanhydride or amino-reactive derivatives thereof,
said polymer having an inherent viscosity of at least about 0.01 dl/g measured as a 0.5% solution of the polymer in N-methyl pyrrolidone at 25° C.

2. The polymer of claim 1 wherein said tetraamine is selected from the group consisting of 3,3',4,4' tetraamino biphenyl and 2,2'-bis-(3,4-diaminophenyl)-hexafluoropropane.

3. The polymer of claim 1 wherein said Ar₁ moiety is an acid monoanhydride selected from the group consisting of 4-trimellitic acid anhydride, 4-trimellitoyl anhydride chloride and hexafluoro-2-(3,4 carboxyanhydrophenyl)-2-(4-carboxyphenyl) propane.

4. The polymer of claim 3 wherein said acid monoanhydride is hexafluoro-2-(3,4 carboxyanhydrophenyl)-2-(4-carboxyphenyl) propane.

5. The polymer of claim 1 having the structure:

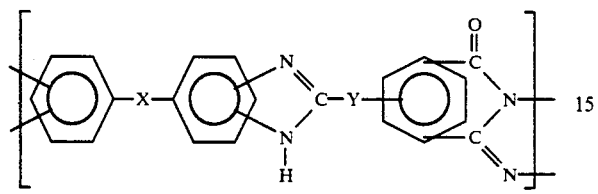

wherein Y is selected from the group consisting of a covalent carbon to carbon bond and

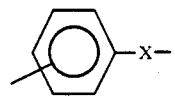

and wherein X is a covalent carbon to carbon bond, or X is a divalent moiety selected from the group consisting of methylene, ethylene, propylene, isopropylene, hexafluoroisopropylidene, 1-phenyl-2,2,2-trifluoroethylidene, dichloro and difluoroalkylenes containing up to 3 carbons, oxy, thio, sulfinyl, sulfonyl, sulfonamido, carbonyl, oxydicarbonyl, oxydimethylene, sulfonyldioxy, carbonyldioxy, disilanylene, polysilanylene containing up to 8 Si atoms, disiloxanylene, and a polysiloxanylene up to 8 Si atoms.

6. The polymer of claim 5 having the structure:

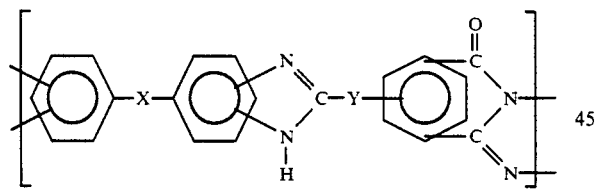

7. The polymer of claim 6 wherein X is selected from the group consisting of a covalent carbon to carbon bond and —C(CF₃)₂—.

8. The polymer of claim 7 wherein Y is

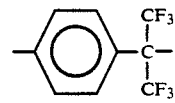

9. The polymer of claim 8 wherein x is —C(CF₃)₂—.

10. The polymer of claim 7 wherein Y is a covalent carbon to carbon bond.

11. The polymer of claim 10 wherein x is —C(CF₃)₂—.

12. A process for preparing the polymer of claim 1 comprising forming the polymer condensation product of (a) an aromatic tertraamine having a structure selected from:

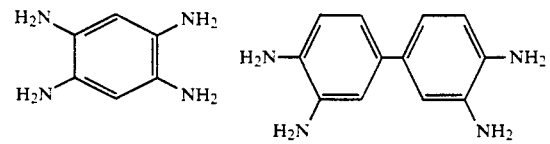

wherein X is a covalent carbon to carbon bond, or X is a divalent moiety selected from the group consisting of methylene, ethylene, propylene, isopropylene, hexafluoroisopropylidene, 1-phenyl-2,2,2-trifluoroethylidene, dichloro and difluoroalkylenes containing up to 3 carbons, oxy, thio, sulfinyl, sulfonyl, sulfonamido, carbonyl, oxydicarbonyl, oxydimethylene, sulfonyldioxy, carbonyldioxy, disilanylene, polysilanylene containing up to 8 Si atoms, disiloxanylene, and a polysiloxanylene containing up to 8 Si atoms, and (b) a tricarboxylic acid monoanhydride or derivative thereof having the structure:

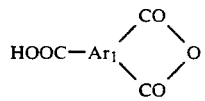

where Ar, is a trivalent aromatic radical selected from:

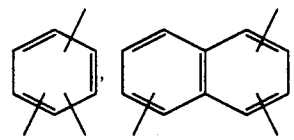

or isomers thereof, and

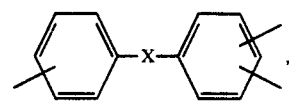

where X is as defined above.

13. The process of claim 12 wherein said tetraamine is selected from the group consisting of 3,3',4,4'tetraamino biphenyl and 2,2'-bis-(3,4-diaminophenyl)-hexafluoropropane.

14. The process of claim 12 wherein said acid monoanhydride is selected from the group consisting of trimellitic anhydride and hexafluoro-2-(3,4 carboxyanhydrophenyl)-2-(4-carboxyphenyl) propane.

15. The process of claim 14 wherein said acid monoanhydride is hexafluoro-2-(3,4 carboxyanhydrophenyl)-2-(4-carboxyphenyl) propane.

16. The process of claim 12 wherein said tetraamine and said acid monoanhydride are reacted in approximately equimolar amounts.

17. A process for preparing the polymer of claim 1 comprising:
  a. combining in a reaction vessel a mixture of aromatic tricarboxylic acid, aromatic tricarboxylic acid monoanhydride or amino-reactive derivative thereof and an aromatic tetraamine, the molar ratio of said acid monoanhydride to said tetraamine being at least about 1:1;
  b. heating said reactants to a temperature of at least about 200° C. for a period of at least about 0.5 hours to produce a polymer precursor;
  c. cooling said prepolymer to a temperature below about 35° C.; and
  d. heating said prepolymer at a temperature of about 275° C. to about 450° C. to cyclize said prepolymer.

18. The process of claim 17 wherein said heating in step (b) is within the range of 300° to 325° C. for a period of from about 1 to about 3 hours.

19. The process of claim 18 wherein said heating in step (d) is within the range of 325° C. to 375° C. for a period of 0.5 to 3 hours.

* * * * *